United States Patent [19]

Takahashi et al.

[11] 4,408,237

[45] Oct. 4, 1983

[54] MAGNETIC RECORD/PLAYBACK APPARATUS

[75] Inventors: Yuji Takahashi; Hideki Hayashi; Satoshi Takagi; Ito Yukio, all of Toda, Japan

[73] Assignee: Clarion Co., Ltd., Tokyo, Japan

[21] Appl. No.: 191,266

[22] Filed: Sep. 26, 1980

[30] Foreign Application Priority Data

Sep. 29, 1979 [JP] Japan .................................. 54-125916

[51] Int. Cl.³ ........................ G11B 15/28; G11B 15/22; G11B 5/54; G11B 21/22
[52] U.S. Cl. .................................... 360/96.3; 360/96.4; 360/105; 360/137; 360/74.1
[58] Field of Search ....................... 360/137, 74.1–74.7, 360/96.3–96.4, , 105

[56] References Cited

U.S. PATENT DOCUMENTS 4,238,808 12/1980 Tomita ............................... 360/74.2

Primary Examiner—Robert S. Tupper
Attorney, Agent, or Firm—Wallenstein, Wagner, Hattis, Strampel & Aubel

[57] ABSTRACT

A magnetic record/playback apparatus in which a member to be operated upon ejecting operation is provided with a projection; a head changeover member provided on a head plate for changing pressing relation between a pinch roller and a capstan is provided with a receiving portion to be actuated by the projection; an interlocking member to be actuated by a play-operation lever is provided with an engaging member engageable with the head plate; and a means for releasing the play-operation lever locked in its depressed position is provided. This apparatus can always start a tape in a predetermined direction after ejection of a cassette and start the tape in a direction so that recording or playback may be assumed where it is left off when the recording or playback is suspended.

3 Claims, 17 Drawing Figures

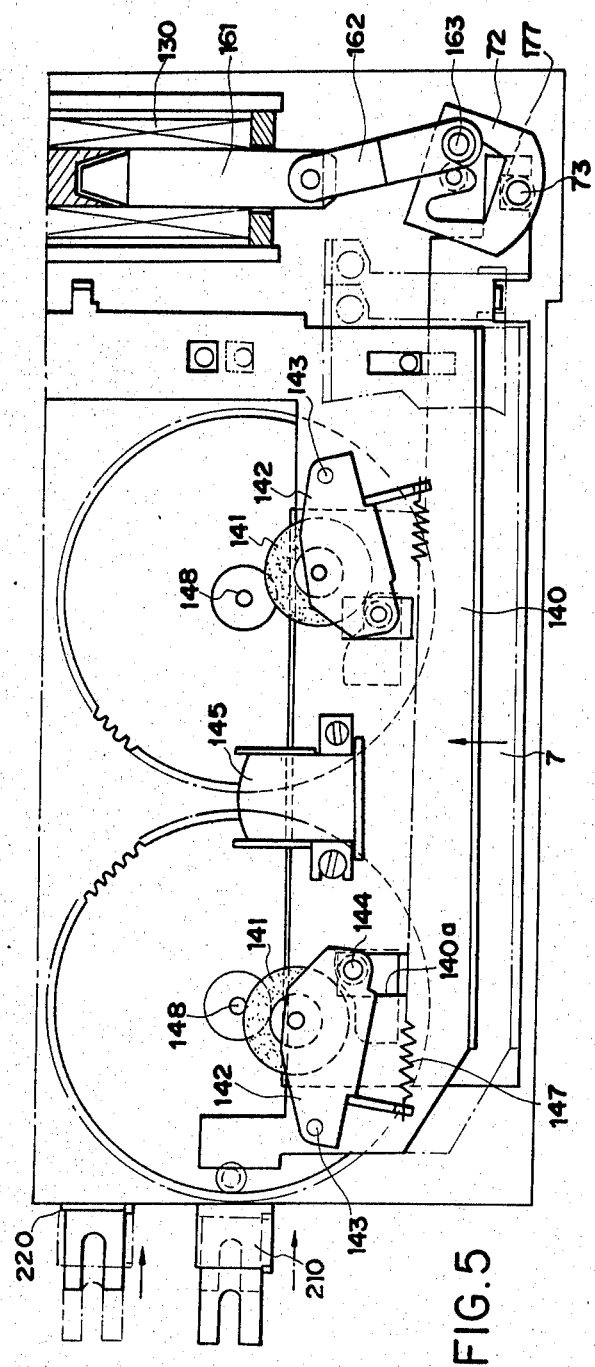
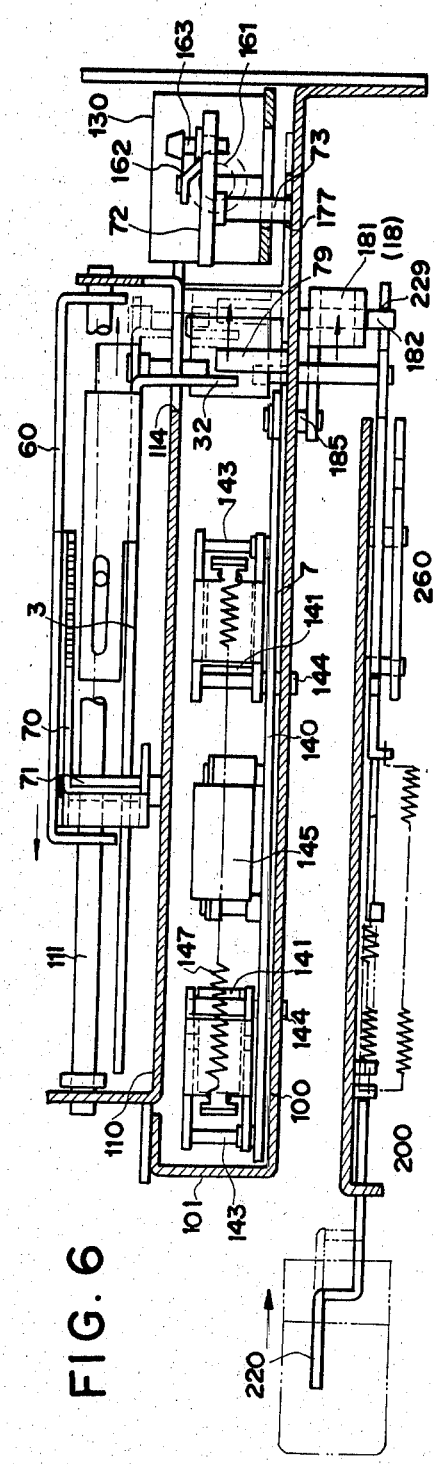
FIG. 5
FIG. 6

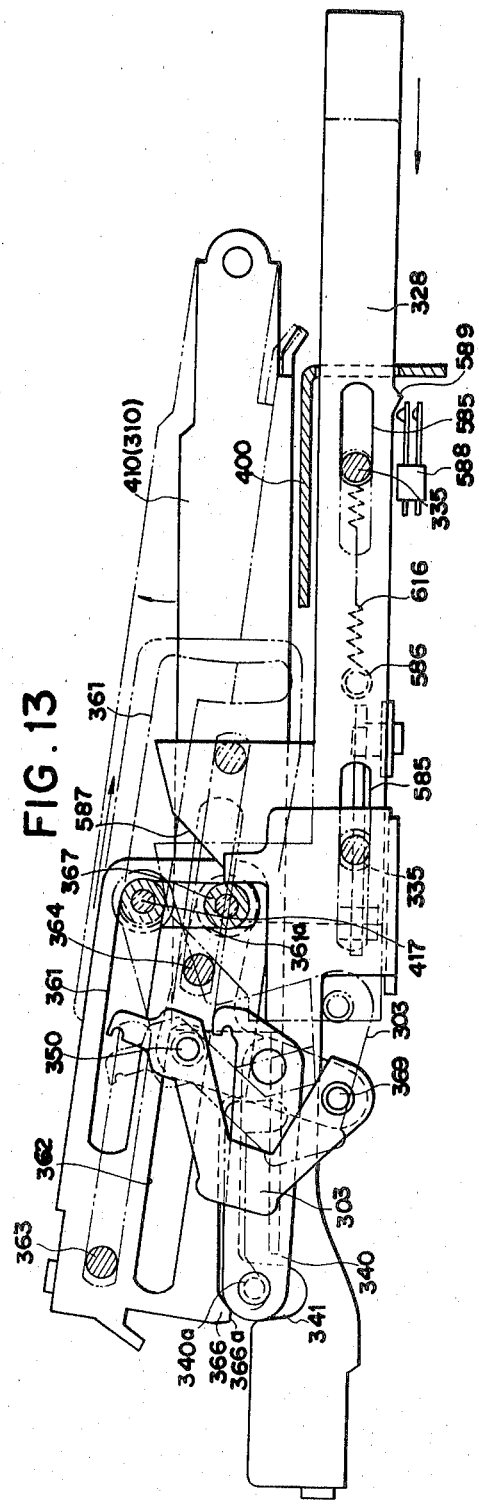
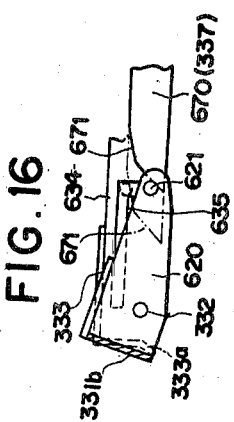
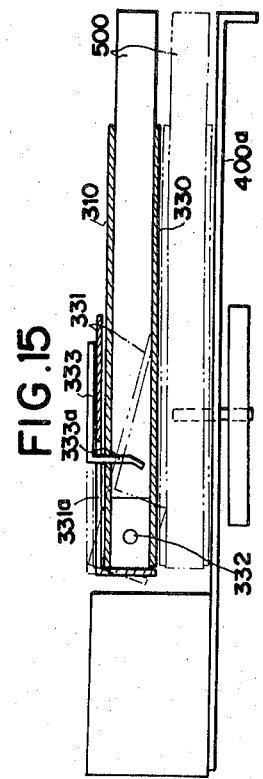

MAGNETIC RECORD/PLAYBACK APPARATUS

BACKGROUND OF THE INVENTION

1. Field of the Invention

This invention relates to a magnetic record/playback apparatus, and more particularly to a magnetic record/-playback apparatus having a novel mechanism for automatically controlling a start direction of tape feed or tape drive, which is capable of performing different operations according to operation modes of the apparatus. A tape is fed in a fixed direction whenever the tape starts upon loading of a tape pack after it has been ejected and the tape is fed in a direction such that recording or reproducing of the tape which has been carried out just before stop of tape feed may be continued when the tape has been stopped.

2. Description of the Prior Art and Summary of the Invention

In a tape player suited for a cassette type tape pack and adapted, when the tape pack has been ejected to be replaced with a fresh one, to start a tape therein in a direction same as the direction the tape has been fed before the ejection, it is necessary to check or confirm the direction of the tape feeding before the ejection whenever a fresh tape pack is loaded. Otherwise, it cannot be known whether the tape is fed in a desired direction or not. To obviate this inconvenience, there has been provided by the present invention a unidirectionally starting tape player which is adapted to start the tape in a fixed direction, whenever a casette changing operation is carried out i.e., forward direction. While such unidirectional start is desirable as the case may be, it is also desired according to necessity when a tape feeding operation is terminated and then re-started so as to go on reproducing of the tape which has been performed just before suspension of the reproducing. The latter system of starting the tape is desirable especially when an operator reverts to the tape player after interruption to resume listening where he has left off. A conventional eject-stop control has two modes of operation. When it is depressed while the play operation control is locked in a depressed play condition, it only releases the play operation control, causing withdrawal of the tape head and pinch rollers from the tape pack. The next operation of the eject stop control effects an eject operation. In the present invention, the operation of the eject-stop control during an eject operation automatically resets the changeover plate 7 to effect tape feeding in a forward direction.

OBJECTS OF THE INVENTION

It is therefore an object of the present invention to provide a magnetic record/playback apparatus which is capable of obviating disadvantages of the conventional magnetic record/playback apparatus.

It is another, more specific object of the present invention to provide a magnetic record/playback apparatus which is capable of starting a tape unidirectionally after ejection of a tape pack and capable of resuming recording or reproducing where it has been left off after pause of the recoding or reproducing.

BRIEF DESCRIPTION OF THE DRAWINGS

FIG. 5 is a fragmentary perspective view of the tape drive mechanism, shown in its reverse feed condition;

FIG. 6 is a sectional view taken along the depth of the tape player;

FIG. 13 is a fragmentary sectional view, showing operational relations with an eject-operation lever;

FIG. 15 is a partly cut-away side view of the automatic shut-off mechanism;

FIG. 16 is a fragmentary side view illustrating operational relations with the eject-operation lever.

DESCRIPTION OF THE INVENTION

Figure 1:
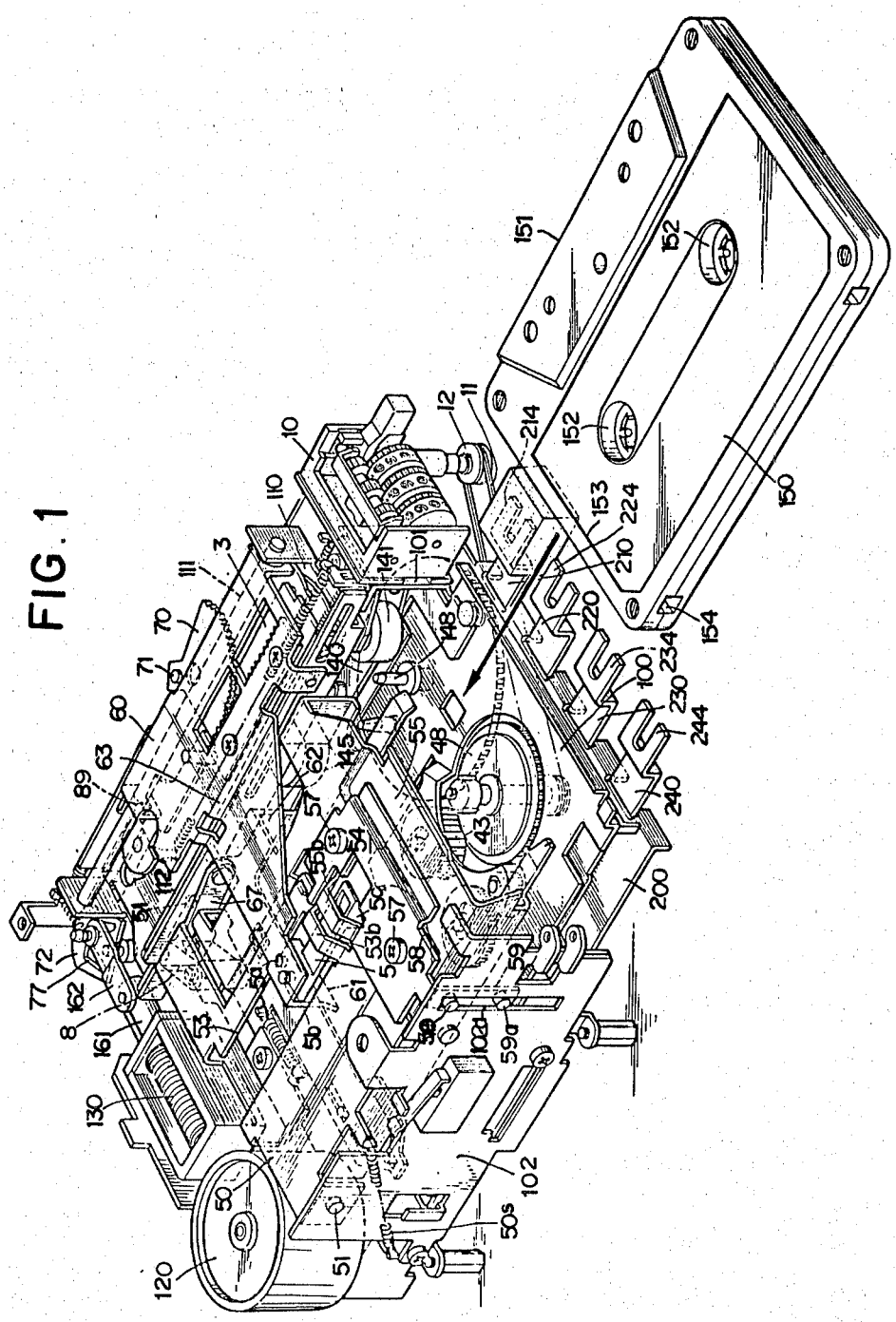
FIG. 1 is a perspective view of one form of a tape player in accordance with the present invention, shown in its ejected state wherein a tape pack is unloaded.
Figure 2:
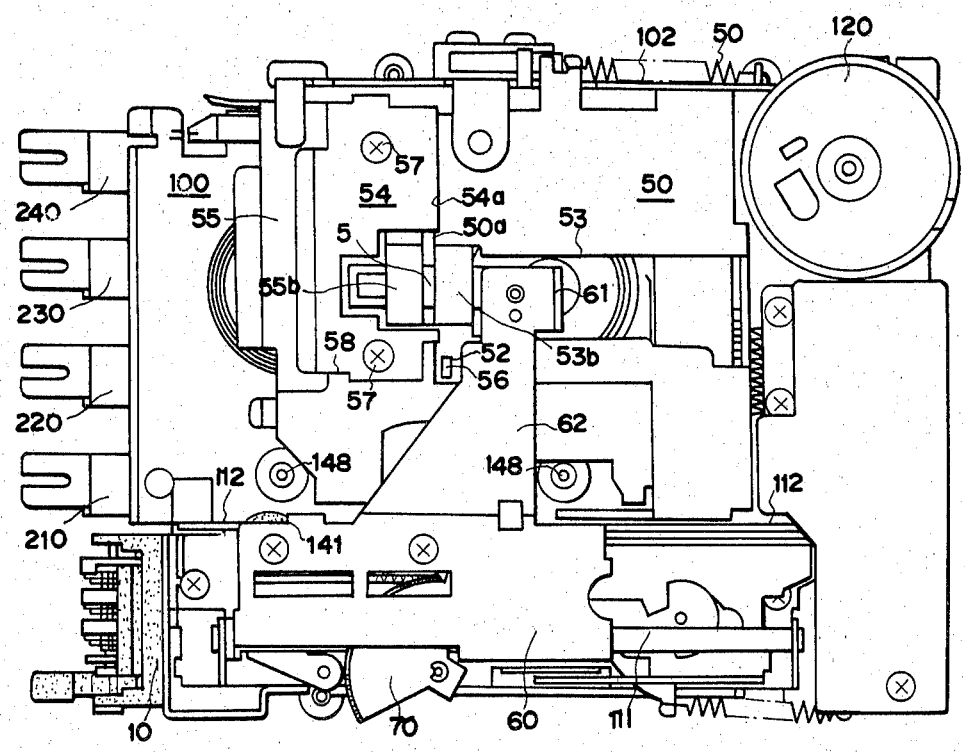
FIG. 2 is a plan view of the tape player.
Figure 3:
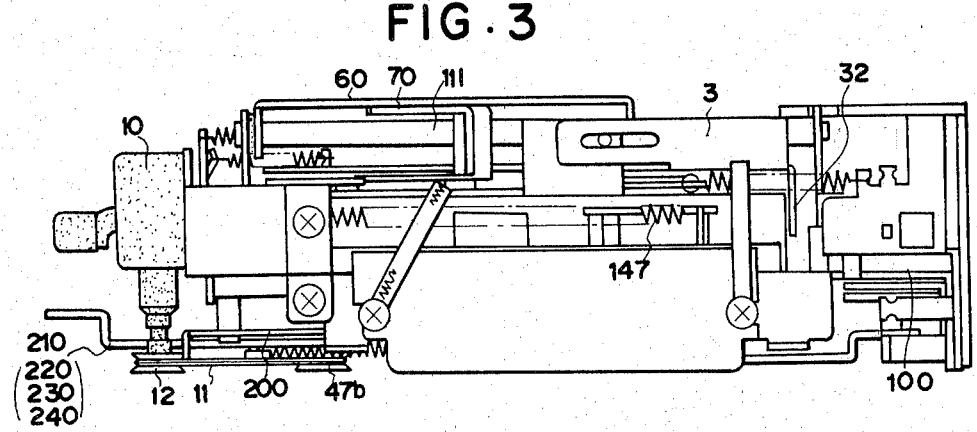
FIG. 3 is a side elevational view of the tape player.

Referring now to the drawings, there is illustrated a preferred form of a magnetic tape player in accordance with the present invention. A main chassis 100 has at a forward sideward portion thereof an upright portion 101. An operating mechanism baseplate 110 is fixed to the upright portion 101. A drive motor 120 and an electromagnetic plunger 130 are mounted on the main chassis 100 at an interior portion thereof. Another baseplate 200 is disposed under the main chassis 100 and attached thereto as illustrated in FIG. 3. On the baseplate 200 there are provided an eject-and stop-operation lever 210, a play-operation lever 220, a fast forward-operation lever 230 and a rewind-operation lever 240. These operation levers are of pushbutton type and adapted to be depressed for carrying out the respective operations. The second to fourth operation levers are levers operative on a tape, while the first operation lever 210 carries out an ejecting operation independant from tape feeding. A sidewall 102 is fixed to the main chassis 100 at a side portion thereof. The sidewall 102 and the baseplate 110 define a tape pack (cassette) loading or receiving area therebetween. A base end of a swingable member 50 is pivotally mounted by pins 51, 51 between the sidewall 102 and an upright portion 112 of the baseplabe 110. A forward end of the swingable member 50 is connected to a cassette receiving frame 55 by a fitting plate 54, allowing a pivotal movement of the frame 55 relative to the swingable member 50. More specifically, the pivotal connection of the cassette loading frame 55 to the swingable member 50 is attained by a cooperation of a slot formed on the swingable member 50 and a projection formed on the frame 55 which are loosely engaged with each other. The connection is further attained by a cooperation of a raised portion 56 formed on the cassette loading frame 55 as high as at least the thickness of the swingable member 50 and the fitting plate 54 fixed to the raise 56 by screws 57, 57 so that an edge 54a of the raise may a bit overhang a forward end 50a of the swingable member 50, leaving some space therebetween in a direction of the thickness thereof. Thus, the frame 55 is allowed to pivot relative to the swingable member 50 within a limit defined by said space therebetween but kept connected to the swingable member 50 by the slot 52 and the overlapped relation between the forward end 50a of the swingable member 50 and the edge 54a of the fitting plate 54.

An opening 53 is formed in the swingable member 50 at a central portion thereof. A slide plate 60 slidably provided on the base plate 110 extends to the opening 53 and has a tip end portion 61 bent downwardly and received in the opening 53. The bent tip end portion 61 of the slide plate 60 is brought into contact with a tip end of a cassette 150 when the cassette 150 is loaded in the cassette loading area so that the slide plate 60 slides according to the retreat of the cassette 150. The cassette 150 has, as known cassette, a recording/reproducing face 151 on a longer side thereof, holes 152, 152 for receiving reel driving members therein respectively and a tape provided between reels disposed around the holes 152, 152, respectively and guided into the recording/reproducing face 151. A stepped portion 153 is also formed on the cassette 150 at a peripheral portion of the holes 152, 152. A head 145 and pinch rollers 141, 141 are mounted on a head plate 140, which is mounted on the main chassis 100 and adapted to be actuated by the play-operation lever 220. The fitting plate 54 has sideward bent portions 58 extending downwardly and provided with guides 59a, 59a. The guides 59a are engaged with guide slots 102a of the sidewalls 102, respectively, so as to guide the cassette loading frame 55 into a playback position.

An engaging plate 5 of a synthetic resin having a resiliency is fixed to the bent tip end portion 61 of the slide plate 60 by a projection 5a and a screw 5b. A forward end portion 5c of the engaging plate 5 is disposed under raised portions 53b and 55b which are formed at a forward portion of the opening 53 and over a cutout 55c formed at an intermediate portion of the cassette loading frame 55 so that it may be bent upwardly. The end portion 5c engages with the rearward hole 152 of the cassette 150 when the cassette 150 is loaded.

Figure 4:
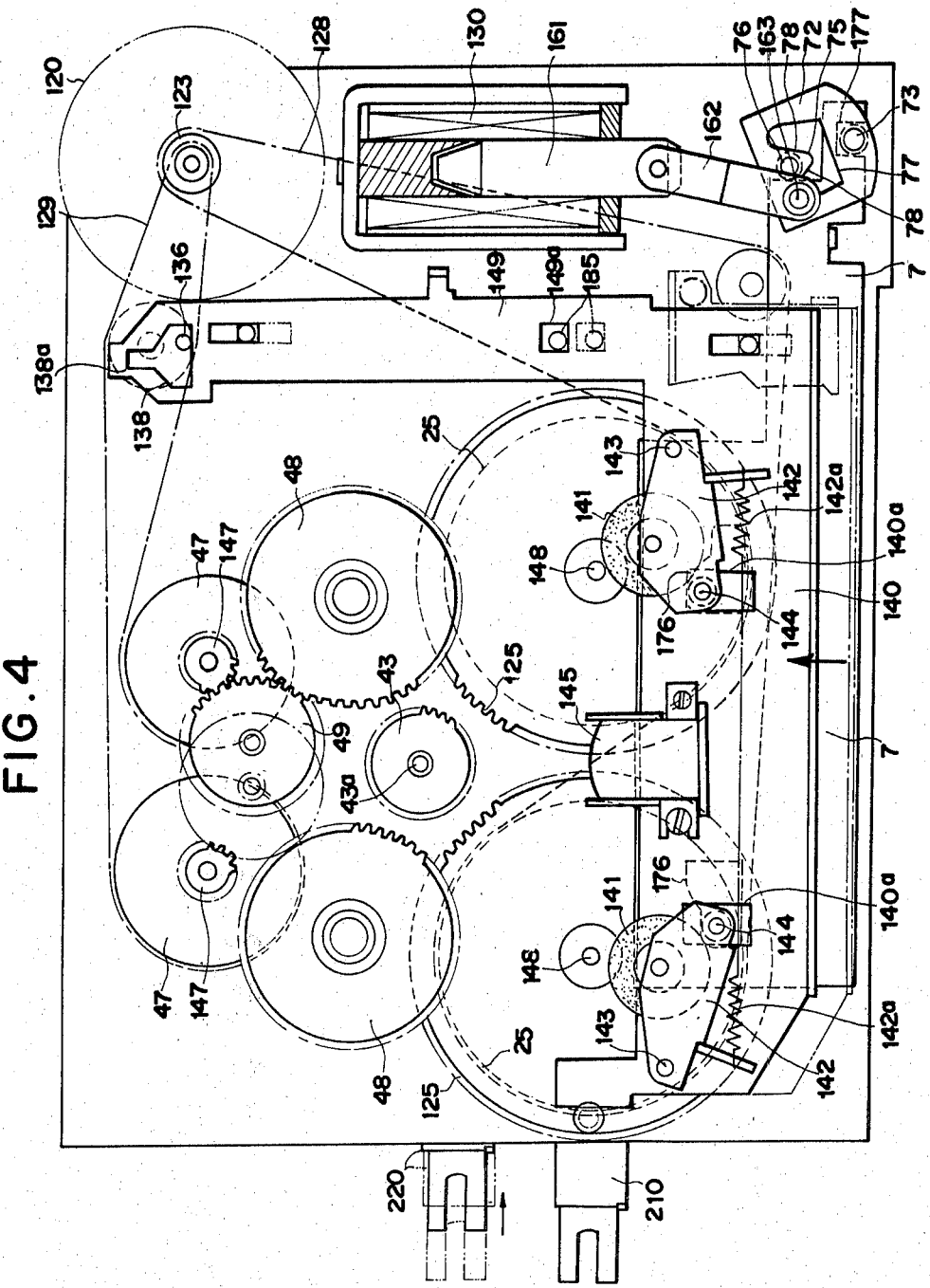
FIG. 4 is an explanatory plan view of a tape drive mechanism of the tape player, shown in its forward feed condition.
Figure 7:
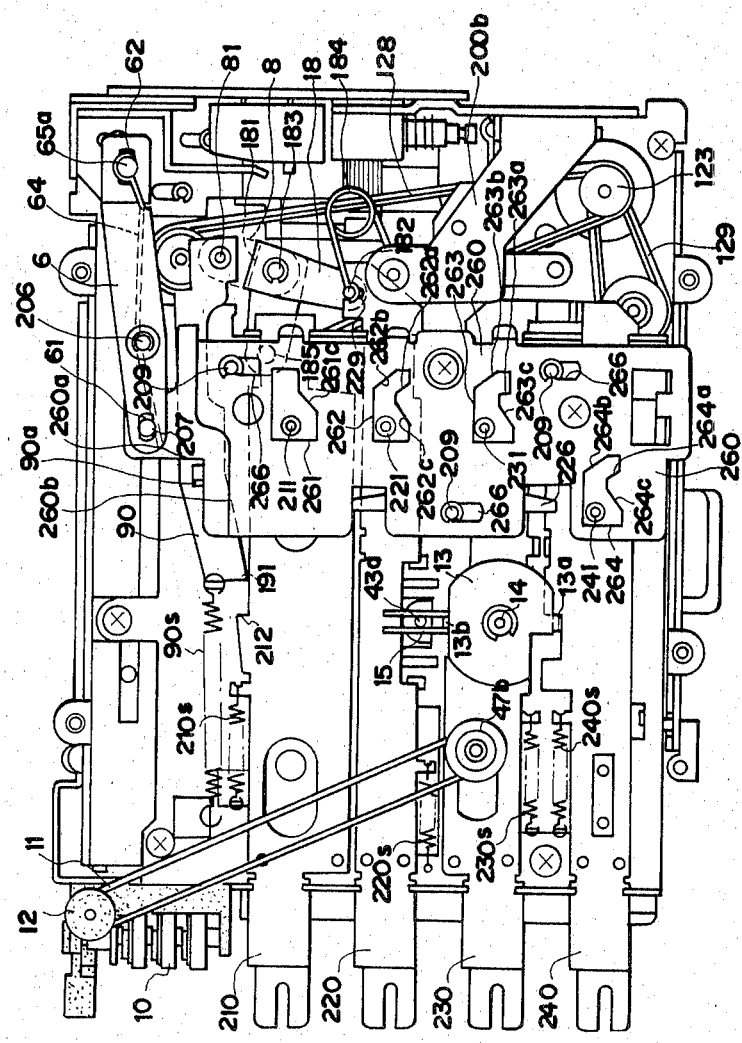
FIG. 7 is a bottom view of the tape player illustrated in FIG. 1, illustrating positional and operational relations between operation levers.
Figure 9:
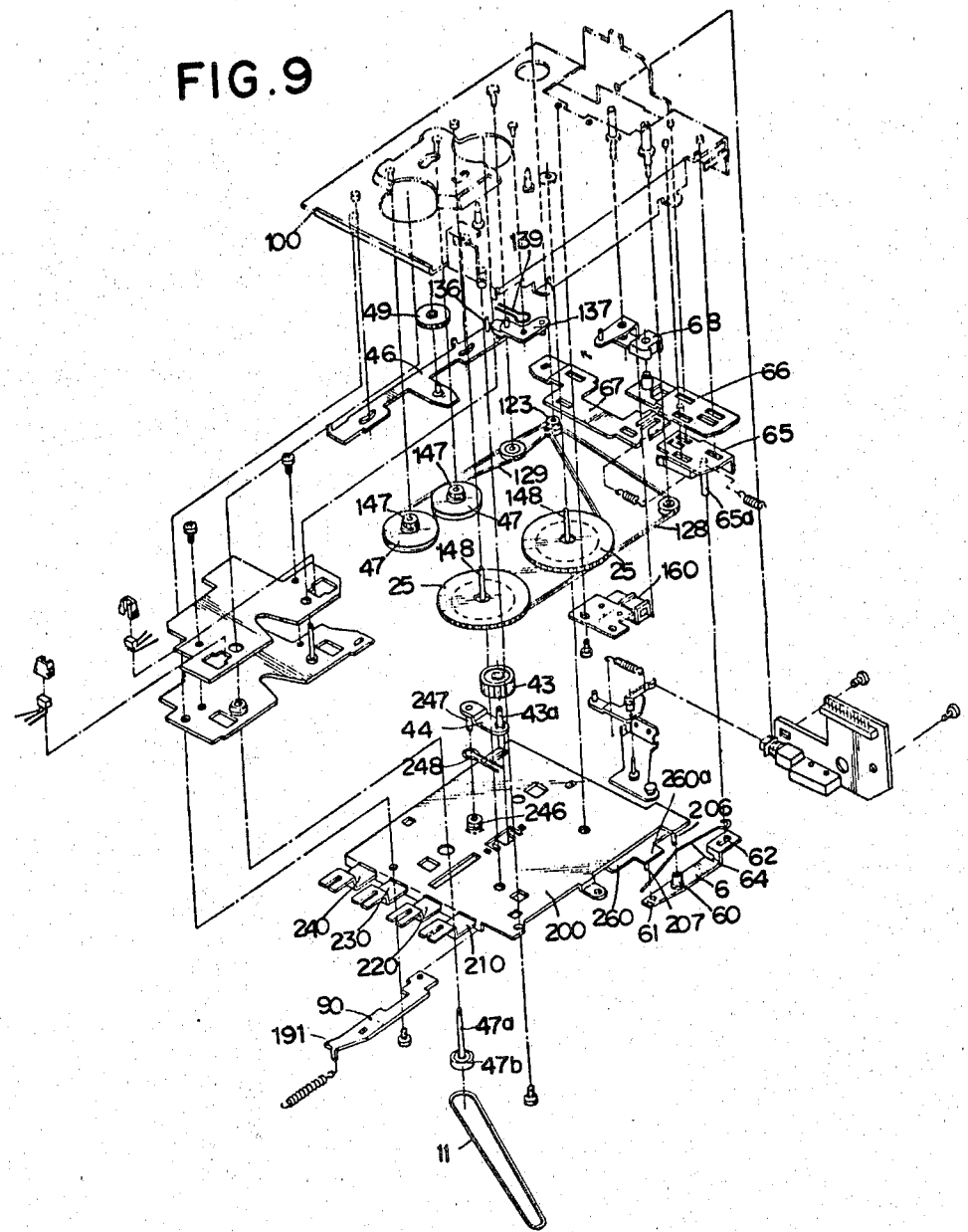
FIG. 9 is an exploded perspective view of components disposed between the chassis and a base plate.

Various components of the tape plate which are mounted on the baseplate 200 are illustrated in FIG. 9 in an exploded state and in FIG. 7 in an assembled state. The operational relationships between the components are illustrated in FIG. 4 to 6. More specifically, three guide pins 209, 209, 209 are provided on the bottom face of the baseplate 200 at an inner portion and intermediate portion thereof, respectively as illustrated in FIG. 7. The guide pins 209 are engaged with elongated slots 265 of a lock plate 260. Between the lock plate 260 and the baseplate 200 are disposed the levers 210, 220, 230 and 240 juxtaposedly each other. The ejecting interlocking member 90 (FIG. 9) provided at a position adjacent the outer side of the first operation lever 210 is also disposed between the base plate 200 and the lock plate 260 as can be seen from FIG. 7. The lock plate 260 is bent at 260b in the direction of its thickness thereof so as to receive the ejecting interlocking member 90 for reducing a space from the baseplate 200. The operation levers have engaging pins 211, 221, 231 and 241, respectively. These engaging pins 211, 221, 231 and 241 are fitted in cam slots 261 to 264 formed on the lock plate 260, so as to allow the operation levers to slide in the longitudinal direction thereof, respectively. The cam slots 261, 262, 263 and 264 have cam portions 261c, 262a to 262c, 263a to 263c and 264a to 264c, respectively, so that the lock plate 260 may effect a change-over operation. Spring 210s, 220s, 230s and 240s are provided on the operation levers, respectively, to urge the levers in directions to reset them, respectively. The interlocking member 90 is also provided with the resetting spring 90s which is mounted between the interlocking member 90 and the baseplate 200. The first operation lever 210 has the salient portion 212 formed on the periphery thereof, which is adapted to engage with the engaging portion 191 formed on a side of the interlocking member 90. A misoperation preventing member 226 is disposed across the respective operation levers so that it may be tilted, when one operation lever is depressed, to allow retreat of the lever and locked, when a plurality of operation levers are depressed concurrently, to check such an inadvertent operation.

As illustrated in FIG. 4, flywheels 25, 25 provided with capstans 146, 146, respectively, are mounted on the main chassis 100. Reel bases 46, 46 and rotor 47, 47 for driving the reel bases 46, 46, respectively, are also mounted on the main chassis 100. A first belt 128 from a motor pulley 123 provided on a motor 120 is wound around the flywheels 25, 25 and a second belt 129 from the motor pulley 123 is wound around the rotors 47, 47 so as to drive the flywheels 25, 25 and the rotors 47, 47 in opposite directions, respectively. Upon switching of an interlocking gear 49 between a position of a solid line in FIG. 4 and a position of a phantom line in FIG. 4, the gear 49 engages with a small gear 147 of either of the rotors 47 and either of the reel bases 46 to drive the engaged reel base 46.

Pinch roller supports 142 each having the pinch roller 141 are mounted on the head plate 140 at opposite positions. Each of the pinch roller supports 142 is supported, at one end thereof, on the head plate 140 by a pivot 143. A passive roller 144 provided at another end of the support 142 is projected downwardly through an opening 140a of the head plate 140 and disposed within a cam slot 176 of a changeover plate 7. Upon a changeover operation of the plate 7 in the lateral direction in FIG. 4, one of the pinch rollers 141 is pressed against the corresponding capstan 146. A spring 142a is associated with each pinch roller support 142 to urge the pinch roller 141 towards the associated capstan 146. The changeover plate 7 has a lock portion 177 at one end thereof. The lock portion 177 engages with an operating portion 73 of a changeover cam member 72 connected to a rod 161 of the electromagnetic plunger 130 through the operating member 73. The cam member 72 is rotatably mounted by a pivot 76 and has angled cams 75, 75 on opposite sides with respect to a central projection 75 in a cam slot 77 formed on the cam member 72. A pin 163 of the operating member 162 is received in the cam slot 77 as illustrated in FIG. 4. When the electromagnetic plunger 130 is energized by a tape end signal etc., the rod 161 is pulled in to rock the cam member 72 and to actuate the changeover plate 7 to the right or to the left as viewed from the drawings to detach one of the pinch rollers 141 from the associated capstan 148 against an action of a spring 142a for effecting an automatic reversing operation.

An eject plate 3 (FIGS. 6 and 8) actuatable by the first operation lever 210 is provided on the operating mechanism baseplate 110 and has a cam portion 31 which lifts an engaging member 50d of the swingable plate 50 within an arcuate slot 113 of the baseplate 110 to accomplish an eject operation. The eject plate 3 has, at a rear end thereof, a projection 32 extending downwardly. The projection 32 is projected through an opening 114 of the baseplate 110 so as to be opposed to a receiving portion 79 formed at a rearward end portion of the head changeover plate 7. The projection 32 acts to actuate the changeover plate 7 when the plate 7 is in the reverse feeding position as illustrated in FIG. 5 to put the same into the forward feed position during the eject operation. This operation is not effected when the changeover plate 7 is in the forward feed position as illustrated in FIG. 4 at the time of ejection. Only when the plate 7 is in the reverse feed position as illustrated in FIG. 5, the projection 32 acts on the receiving portion 79 as illustrated in FIG. 6 to effect such an operation. Thus, the tape player of this invention can assure unidirectional starting.

Figure 8:
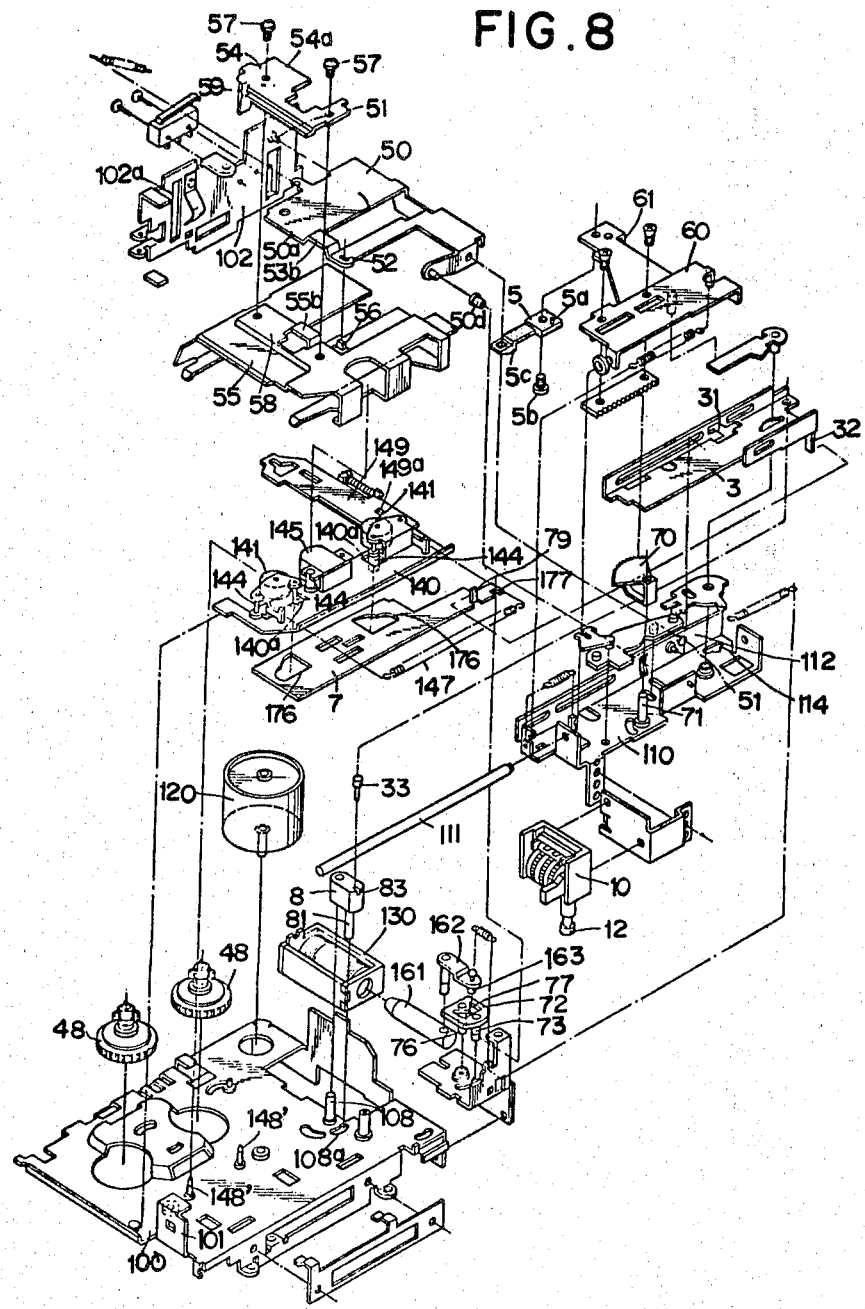
FIG. 8 is an exploded perspective view of components disposed on a chassis of the tape player.

A pivotal shaft 108 and an arcuate slot 108a as shown in a broken line in FIG. 8 are provided at a rearward portion of the main chassis 100. The pivotal shaft 108 supports an end of an actuating member 8. A projection 81 provided at a lower face of the actuating member 8 extends through the arcuate slot 108a lower than a bottom face of the main chassis 100. A pin 33 provided at a rearward portion of the eject plate 3 is engaged with a cutout 83 formed at an upper portion of the actuating member 8. The projection 81 engages with the rear end portion of the interlocking member 90 under the main chassis 100 as illustrated in FIG. 7. Therefore, when the tape pack 150 is loaded into the playback position to reset the eject plate 3, rotating the actuating member 8 to engage the engaging portion 191 with a projection 212 from a position as illustrated in FIG. 7 wherein the projection 191 of the interlocking member 90 is disengaged from the projection 212, and the first operation lever 210 is then depressed, the interlocking member 90, the actuating member 8 and the eject plate 3 are actuated all together to attain a changeover operation for the unidirectional start.

A rotatable member 6 is rotatably mounted at a rear sideward portion of the baseplate 200 through a sleeve 60 provided at an intermediate portion of the member 6 and a shaft 206 of the baseplate 200. The lock plate 260 has a pin 207 at a projected portion 260a thereof, while the rotatable member 6 has elongated slots 61, 62 at opposite end portions thereof to receive the pin 207 and a pin 65a provided on a slide member 65, (FIG. 9) respectively. A resilient member 64 is fitted to a mounting shaft 206 and the pins 207 and 65a to resiliently interlock the lock plate 260 with the slide member 65. A slide member 66 having a magnetic material member 68 and a slide member 67 are assembled to the slide member 65 so as to interlock with each other. In relation with the magnetic material member 68, an electromagnetic mechanism 160 is provided on the chassis 100.

The second (play) operation lever 220 has, at a rear end portion thereof, an engaging portion 229 as illustrated in FIG. 7. The engaging portion engages with a pin 182 provided at an end portion of an arm of an interlocking member 18. The interlocking member 18 is formed in a horizontal L-shape and has two arms which are formed integrally with each other and bent at a portion 18a so as to be disposed at different hights in the direction of the thickness. The interlocking member 18 is rotatably supported, at the connection of the arms, on the baseplate 200 by a pin 183 provided on the baseplate 200. A pin 185 provided at an end portion of the another arm of the interlocking member 18 is engaged with a slot 149a of an extension 149 of the head plate 140 as illustrated in FIG. 4. A resetting resilient member 184 in the form of toggle spring is provided between the pin 182 and a support portion 200b of the baseplate 200. When the second operation lever 220 is depressed and locked, the head plate 140 is displaced from the position of the phantom line in FIG. 4 to the position of the solid line in FIG. 4 to press the pinch roller 141 against the capstan 148 as illustrated in FIG. 4.

A ⊔ shaped slot 138 formed at an end portion of the extension 149 of the head plate 140 engages with a projection 136 of a drive changeover plate 46 (FIG. 9) having the interlocking gear 49. The drive changeover plate 46 is interlocked with the changeover operation of the tape feed direction by the changeover plate 7 to mesh the interlocking gear 49 with one of the small gears 147 of the reel bases 47 for taking up the tape. Under such a condition that the interlocking gear 49 is meshed with either of the small gears 147, when the reproducing operation is suspended, the head plate 140 is caused to retreat so that projection 136 is released into a neutral position from the engagement with the ⊔-shaped slot 138. More specifically, as the extension 149 of the head plate 140 retreats from the position of FIG. 4, i.e., is moved downwardly in FIG. 4, the projection 136 is guided to a central portion 138a of the slot 138 to assume the neutral position. When the head plate 140 is then advanced to a reproducing position, the projection 136 is displaced out of the central portion 138a into the position for reproducing as illustrated in FIG. 4. This resetting operation is controlled by the resilient member 139 (FIG. 9) of the L-shaped member 137 connected to the drive changeover plate 46. The suspension of the reproducing is carried out by deenergizing the electromagnetic plunger 160 or by suitable mechanical means.

When the second (play) operation lever 220 is depressed under the condition of FIG. 7, the pin 221 acts on the cam portion 262b to displace the lock plate 260 upwardly from the position of FIG. 7. Under this condition where the pin 221 is locked in the cam portion 262a, when the pin 211, 231 or 241 of the operation lever 210, 230 or 240 acts on the cam portion 261c, 263c or 264c, respectively, to displace the lock plate 260, the magnetic member 68 is detached from the electromagnetic plunger 160 and a play-stop mode is attained.

This play-stop mode is a condition where the head plate is in a retired position. Therefore, it is apparent that the preceding play can be resumed in succession when the second operation lever 220 is depressed again from the play-stop position.

In the present embodiment, a counting mechanism 10 is mounted on the main chassis at a position adjacent to the first operation lever 210. A belt 11 is provided across a pulley 12 of the counting mechanism and a pulley 47b fixed to a shaft 47a of the reel base 47 for count and indication. In relation with the third and fourth operation levers 230 and 240 for the fast-forward and the rewind operations, a rotating member 13 is provided so as to be rotatable by a shaft 14 and has projections 13a and 13b which are engageable with engaging portions 230c and 240c, respectively. A U- shaped resilient member 15 is fitted to the shaft 14 and the projection 13b and holds, between tip ends thereof, a shaft 43a of the interlocking gear 43 positioned between the reel bases 48, 48 and geared portions 125, 125 of the flywheels 25, 25 as illustrated in FIG. 4. When either of the levers 230 and 240 is depressed, the interlocking gear 43 brought into mesh with either of the reel bases 48 and the corresponding geared portion 125. Thus, the reel base 48 is driven directly by the flywheel 25 to enable high-speed tape take-up. The interlocking gear 43 is supported, at an end of a support member 44 as depicted in FIG. 9, by the shaft 43a. The support member 44 is rotatably received in a bearing 246 on the baseplate 200 by a pin 247. A resilient member 248 is fitted to the support member 44 to normally urge the interlocking gear 43 into a neutral position where the gear 43 is not in mesh with either of the reel bases and geared portions of the flywheels.

In accordance with the present invention as described above, when the first eject-stop operation lever 210 for ejection has been operated, the projection 32 of the eject plate 3 selectively acts on the receiving portion 79 of the head changeover plate 7. More specifically, the receiving portion 79 is out of the region where the projection 32 is operative when the ejection has been effected under the forward feeding condition and the projection 32 acts on the receiving portion 79 to changeover the head changeover plate 7 into forward feeding position only when the ejection has been carried out under the reverse feeding condition. Thus, reproducing is resumed in the forward direction after the ejection and unidirectional start is assured. Furthermore, when the second (play) operation lever 220 for reproducing is depressed again after the reproduction is suspended, the reproduction is resumed where it is left off.

In accordance with a preferred embodiment of the present invention, there is provided a tape player wherein pressing of pinch rollers and idlers is released, for example, by a tape end detection signal and which is capable of preventing deterioration in a characteristic of wow and flutter and capable of increasing durability of the tape player.

After a tape comes to an end in reproducing or recording, if rotation continues to be applied, there are caused high-load rotation and a slip in relation with a reel base. Even thouth a pinch roller stops rotation, the pinch roller is kept to be pressed against a capstan. Thus, there have been caused shortening of life of the rotation components and deterioration in a characteristic of wow and flutter. To obviate these disadvantages, various methods have been proposed. For example, when the tape comes to an end, a lamp is lit or a sound is generated to indicate that the tape has reached the end. However, in these cases, manual operations such as ejection etc. must be carried out to avoid the aforesaid deterioration or shortening of life. By this reason, automatic ejection has been employed, but a mechanism for carrying out the automatic ejection must be complicated and expensive to manufacture and yet requires considerable energy to eject a tape pack.

Therefore, the preferred embodiment of the present invention contemplates a tape player which is capable of avoiding deformation of pinch rollers and idlers due to the pressing after a tape reaches an end, capable of establishing a stop condition without requiring such a complicated mechanism and operation as in an automatic ejection system, and yet capable of manufacturing at a reasonable cost and inparting a stable quality.

Referring now to FIGS. 10 to 17, there is illustrated an automatic stop mechanism employable in the present invention. In the embodiments illustrated in FIGS. 10 to 17, the automatic stop mechanism is applied to a tape player of a type different from that of the foregoing embodiment, but the mechanism may also be applicable to a tape player with an automatic reverse mechanism as of the foregoing embodiment.

Figure 10:
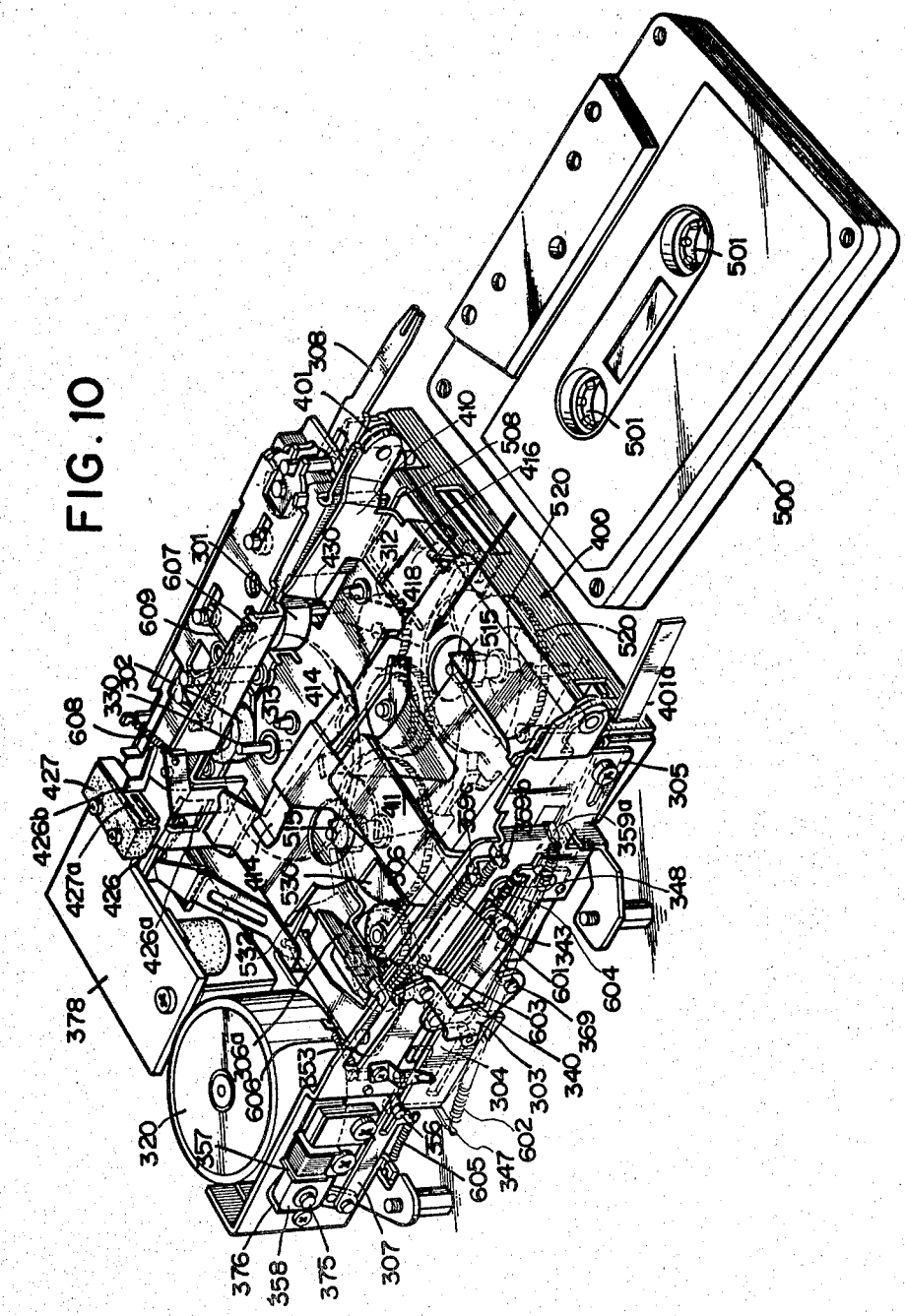
FIG. 10 is a perspective view of another form of tape player having an automatic shut-off mechanism in accordance with the present invention.

A deck 400 bent downwardly at a forward portion thereof has a pivotal seat portion 401 at a forward, side portion thereof as illustrated in FIG. 10. A guide member 305 fixed to another side of the deck 400 also has a pivotal seat portion 401a at a forward position thereof opposite to the pivotal seat portion 401. A cassette receiving frame 310 bent upwardly at side portions thereof to define a guide portion therebetween is pivotally connected, at a forward portion thereof, to the portions 401 and 401a. The cassette receiving frame 310 has a construction as explodedly illustrated in FIG. 12. A rigid press member 411 and a thin resilient press member 413 are superposed and fixed to one side portion of the cassette receiving frame 310. The press member 411 is bent in an L-shape as illustrated in the figures, and the resilient press member 412 has a receiving resilient press portion 413 formed in the vicinity of a cassette receiving inlet and intermediate resilient press portions 414 and 414 formed at a portion extending beyond a tip end of the press member 411, so as to resiliently press a cassette 500 inserted into the guide portion against a base of the cassette receiving frame 310.

The base portion of the cassette receiving frame 310 has openings 415 for receiving reel drive members 515 therein respectively. The cassette receiving frame 310 has, at a forward, side portion thereof, a hanging portion 418 bent downwardly and, at a rear, opposite side portion thereof, a pin 417. A tip end portion of the pin 417 engages with a first engaging slot 361 of a slide member 306 which is attached to the guide member 305. As can be seen from FIG. 12, the pin 417 extends through an opening formed at one end portion of an L-shaped actuating member 360 which interposed between the upright portion of the cassette receiving frame 10 and the slide member 306. A roller 367 is loosely fitted around the pin 417 between the L-shaped actuating member 360 and the slide member 306 so as to reduce friction between the slide member 306 and the actuating member 360. The first engaging slot 61 of the slide member 6 is crooked at a forward portion 61a thereof to be formed into an L-shape as illustrated in FIG. 6. The slide member 6 further has a second engaging slot 62 as illustrated in the figure, which is engaged with one end portion of a pin 50 provided at an intermediate position of the guide member 5 so as to project from opposite faces thereof. The end portion of the pin 50 is fitted in a pivotal hole 60a which is formed at a corner portion of the actuating member 60. A rear end portion of the slide member 6 is bent horizontally to form an L-shaped receiving portion 6a. A pin 64 engaging with a first guide slot 51 formed at a forward portion of the guide member 5 is provided at a position on a line extended from the second engaging slot 362 in a longitudinal direction thereof. Another pin 363 is further provided on the guide member 305 at a rear end portion thereof so as to engage with a third guide slot 353 formed at a rear, upper portion of the guide plate 305. The guide slots 351 and 353 gently slope up in rearward directions. An engaging projections 366 is formed at a rear, lower portion of the slide member 306 and is adapted to engage with and disengage from an engaging member 340a of another actuating member 340.

The guide member 305 further has, at a forward, lower portion thereof, a second guide slot 352 and, at rear, lower portions thereof, fourth and fifth guide slots 354 and 355. The second guide slot 352 and the fifth guide slot 355 receive pins 342 and 345 therein, respectively, which are provided respectively at rear and forward portions of another slide member 304 acting as an operating member in the mechanism of this invention, attached to an outer, lower portion of the guide member 305, so as to guide the sliding of the slide member 304. The fourth guide slot 354 has guide portions 354a and 354b extending downwardly at forward and rearward portions of the slot 354 respectively and engaged with the engaging member 340a formed at a rear end portion of the actuating member 340 which is rotatably attached to the outside of the slide member 304 by a pivot 343. The slide member 304 has a cutout portion 341 formed at the upper edge thereof so as to allow the engaging member 340a to be engaged with the fourth guide slot 354 to move up and down around the pivot 343 and to lock the engaging member 340a at its retired position. The slide member 304 has, at a forward portion thereof, a horizontal cam portion 344 in parallel with the base of the deck 400 and, at a lower portion thereof, a lock portion 346 projected downwardly. A spring 604 is provided between a spring rest 348 formed at a forward, upper portion of the slide member 304 and a spring rest 349 formed at a forward portion of the actuating member 340.

A connecting member 369 provided at a lower portion of the L-shaped actuating member 360 is connected to a lower portion of an interlocking member 303 crooked at an intermediate portion thereof and disposed at a position outer than the actuating member 340. An upper portion of the interlocking member 303 is pivotally supported by a pin 350 of the guide member 305. A spring 603 is provided between a spring rest 303a formed so as to extend upwardly from such a pivotal support portion and a second spring rest 359b of the guide member 305. The guide member 305 has a stepped portion 305b at a rear portion thereof. An electromagnetic mechanism 357 is fixed at a position rearward of the stepped portion 305b, and a pin 356 is provided under the electromagnetic mechanism 357 so as to engage with a guide slot 371 of an interlocking link 307. A portion of the interlocking link 307, which is formed forwardly of the stepped portion 305b and inside of the guide member 305, has a lock portion 372 formed in a recess so as to engage with the rear engaging member 345 of the slide member 304. A rear end portion of the interlocking link 367 is connected to a lower end of a magnetic member mounting member 370 by a connecting member 373. A pivot 374 projected inwardly intermediate between the ends of the mounting member 370 is inserted in a hole 305c formed at a rear portion of the guide member 305. A shaft 375 provided at an upper portion of the mounting member 370 carries a magnetic member 358 so as to allow tilting of the member 358. A stopper 376 is formed in the vicinity of the shaft 375 so as to prevent the magnetic member 358 from being tilted too much around the shaft 375.

The cam portion 344 of the slide member 304 is engaged with a pin 311a provided at an intermediate portion of a rotating member 311 pivotally connected at one end thereof to an auxiliary deck 450 attached to the lower face of the deck 400. A tip end of the rotating member 311 is provided with a connecting member 311b for connecting one end of an interlocking member 312. Another end of the interlocking member 312 is connected to a pin 430 provided on a head plate 313 mounting a head 301 thereon. A tip end of a pinch roller holder 432 mounting a pinch roller thereon abuts against a shaft 431 provided so as to stand at an intermediate position of the head plate 313. The shaft 431 is provided with a spring 433. The spring 433 acts to normally push the head plate 313 and a free end of the pinch roller holder 432. The interlocking member 312 has a projected portion 420 formed at an intermediate position thereof. The projected portion 420 abuts against an engaging member 434 provided on a resilient member 425 which is attached at one end thereof to the lower face of the auxiliary deck 450. The resilient member 425 is disposed under the lower face of the cassette receiving frame 310 in relation with the hanging portion or operating portion 418 formed by bending the portion 416 inwardly at a position suitably spaced from the pivotal seat portion 401, so that when the frame 310 is lowered, the resilient member 245 is pressed downwardly to release abutment between the engaging member 424 and the projected portion 420.

Figure 12:
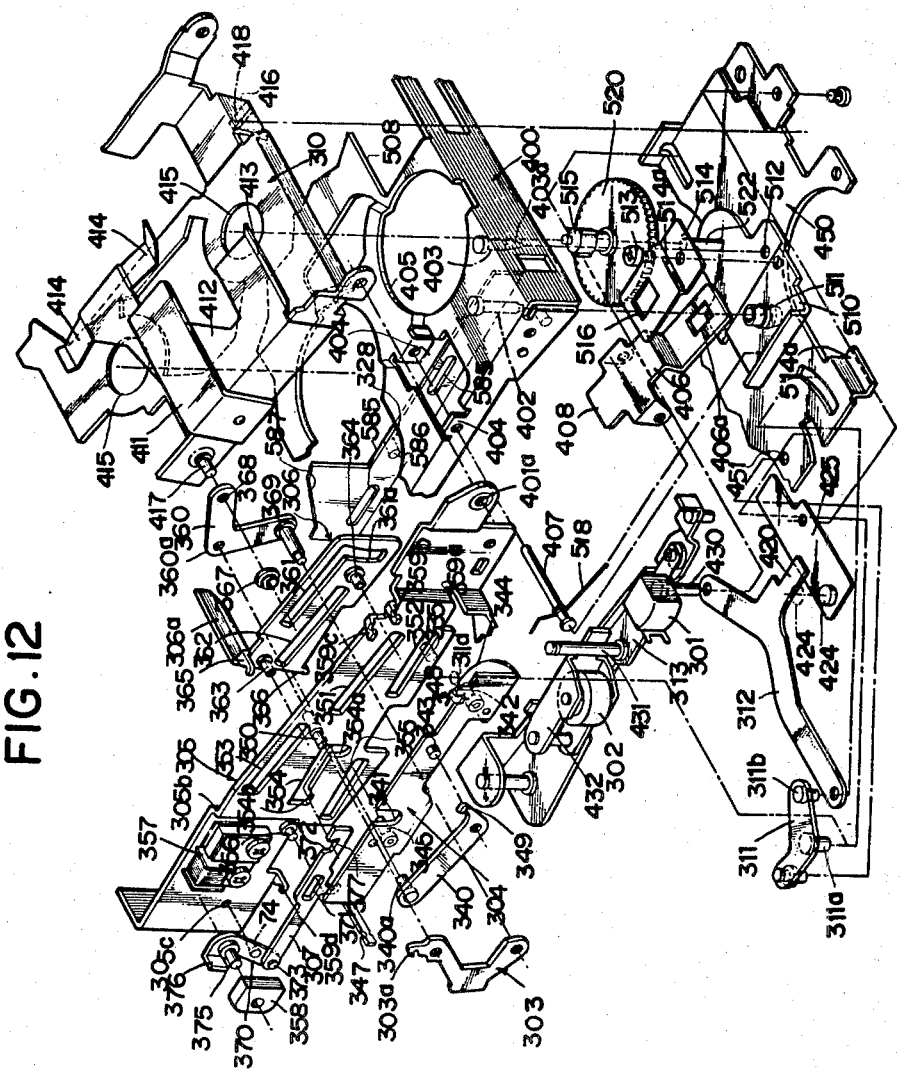
FIG. 12 is an exploded perspective view of components of the tape player illustrated in FIG. 10.

Two guide shafts 402 and 403 are on the lower face of the deck 400 at positions near the cassette receiving inlet. The guide shafts 402 and 403 are fitted in a reel base support 510 as illustrated in FIG. 12. More specifically, one of the guide shafts 402 is received in a cylindrical guide 511 provided on the reel base support 510 for guiding up and down movement of the support 510, while another guide shaft 403 is just inserted in an opening 512 for preventing the support 510 from being rotated when the support 510 is lowered and raised. A reel base 520 having a reel drive member 515 is rotatably supported at a shaft 522 thereof by one end of the reel base support 510. A lock plate 514 is fixed to the reel base support 510 by a screw 513. The lock plate 514 has an opening 516 at a position rear of a stepped portion 514a. A tip end portion of an operating member 406 pivotally connected, at one sided position, by a pin 407, to pivotal seats 404 formed at positions near a reel base mounting opening 405. More specifically, a square slot 406a formed at this tip end portion of the operating member 406 is superposed on the opening 516 so as to insert the guide 511 and the guide shaft 402 therethrough. A base end 408 of the operating member 406 is exposed over the deck 400 at a position interior of the pivotal seats 404 and 404 and located under the lower face of the cassette receiving frame 310.

Figure 11:
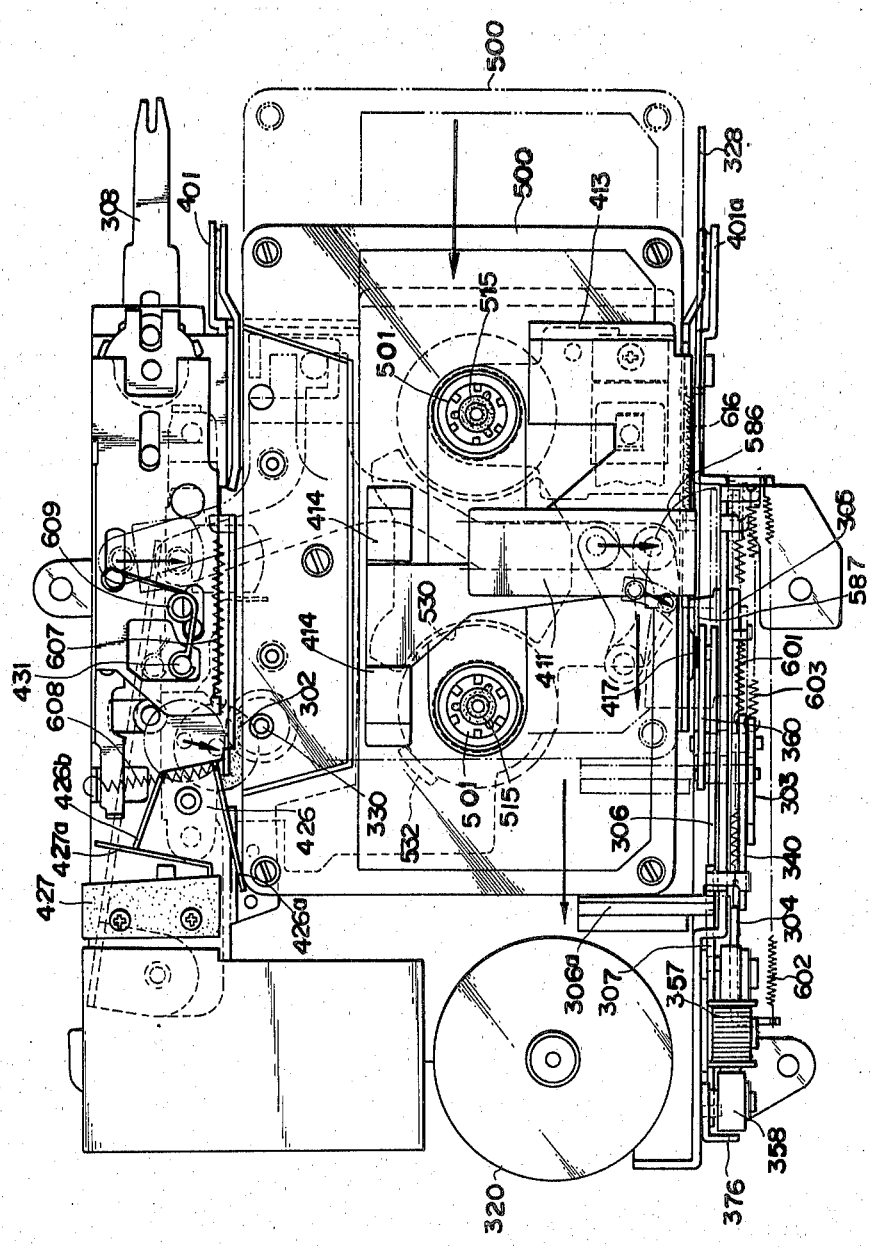
FIG. 11 is a plan view of the tape player illustrated in FIG. 10.

A switch actuating member 426 is rotatably provided at the interior of the deck 400 as illustrated in FIGS. 10 and 11 and urged by a spring 608 so that a receiving portion thereof may project into a rear portion of a cassette receiving area. An operating portion 426b of the switch actuating member 426 is disposed in relation with an operating portion 427a of a switch 427. Another reel base 530 is provided so as to oppose to the reel base 520. A magnetic member 531 is provided on the reel base 530 and a reed switch is attached to the magnetic member for detecting rotation of the reel base 530. A signal of stop of the rotation of the reel base 530 operates a transistor on a printed board 378 as illustrated in FIG. 10 to open an electrical circuit for the electromagnetic mechanism 357.

An eject-operation lever 328 is provided under the deck 100 at a sideward portion thereof for manually carrying out ejection of the cassette. The eject-operation lever 328 has a guide slot 585 extending along the depth of the tape player. The guide slot 585 receives pins 335 and 335 provided on the guide plate 305 and the deck 400. A spring 616 is provided between one of the pins 335 provided on the deck 400 and an engaging member 586 of the eject-operation lever 328 to normally urge the lever 328 so as to push the lever 328 forwardly. The eject-operation lever 328 further has an operating cam portion 587 as illustrated in FIG. 13. The operating cam portion 587 is positioned so as to be engageable with the bent portion 361a of the first slot 361 of the slide member 306. The eject-operation lever 328 has, at a lower edge thereof, a switch operating portion 589 which is operative on a normally-on switch 588 mounted on the deck 400 and incorporated in an electric circuit for an electromagnetic mechanism 357. In the course of depression of the eject lever 328, the switch operating portion 589 operates the switch 588 to open it for releasing attraction by the electromagnetic mechanism before the cam portion 287 acts on the roller 67.

The operation of the tape player as illustrated in FIGS. 10 to 13 will now be explained. When a cassette 500 is inserted along the cassette receiving frame 310 with the rear portion raised around the pivotal seat portions 401 and 401a as illustrated in FIG. 10, the leading end, i.e., the rear end of the cassette 500 engages with the engaging portion 306a of the slide member 306 to retreat the slide member 306 against the action of the spring 501. The slide member 306 is guided slantingly upwardly along the inclinations of the slots 351 and 353. Simultaneously, the engaging projection 366 engages with the engaging member 340a of the actuating member 340 and pushing the actuating member 340 rearwardly along the guide slot 354. As a result, the operating member, i.e., the slide member 304 connected to the actuating member 340 by the pin 343 is als pushed backwardly against the action of the spring 502. Thus, an energy for ejection is stored in the spring 502. During the retreat of the actuating member 340 and the slide member 4, the actuating member 340 rotates clockwise in the positions as illustrated in FIGS. 11 and 12 by the spring provided between the actuating member 340 and the slide member 304.

As the engaging member 340a retreats to the interior of the fourth guide slot 354, the engaging projection 366 of the slide member 306 is guided slantingly upwardly so that projection 366 is raised relative to the engaging member 340a and depresses the engaging member 340a into the recessed portion 354b of the guide slot 354 due to a relation between a bent arcuated portion 366a formed at a tip end of the engaging projection 366 and circumferential surface of the engaging member 340a as illustrated in FIG. 13. In the course of lowering of the pin 340a, the pin 340a descends at a position rear of the guide portion 354b so that it is not checked by the hook 377 of the interlocking link 307 which is positioned at a forward portion of the guide portion 354b. Thus, the pin 340a is locked by the hook 370 and held in the lock portion 372 without any trouble under the condition where the magnetic member 358 is attracted by the electromagnetic mechanism 357 energized upon loading of the cassette 500. After the locking condition has been established, the engaging projection 366 of the slide member 306 passes over the engaging member 340a and retreats until the vertical portion 361a of the first engaging slot 361 of the slide member 306 reaches the pin 417. When the pin 417 is positioned at the vertical portion 316a the interlocking member 303 rotates clockwise in FIG. 13 around the connecting member 69 to lower the rear portion of the cassette receiving frame 310 onto the deck 400 through the pin 363 for providing a playback position.

When the frame 310 with the cassette held thereon is lowered onto the deck 400, the operating portion 418 of the frame 310 depresses the resilient member 425 so that the projection 420 locked by the locking member 424 of the resilient member 425 is released. As a result, the head plate 313 is advanced by the action of the spring 609 so that the head 301 and the pinch roller 302 are pressed against a tape of the cassette 500 loaded in the playback position. Thus, the tape runs between the pinch roller 302 and a capstan 330 driven by the motor 320 energized upon closing the switch 427. Since the operation of the head plate 313 is carried out after detection of the cassette 500 set in the playback position by the operating portion 418 and the resilient member 425, the head plate 313 is surely operated at an appropriate timing and there is no fear that the head plate 313 is operated before the cassette 500 has not been set in the playback position. Upon lowering of the frame 310 onto the playback position, the base portion 408 of the operating member 406 raised above the deck 400 is depressed by the bottom of the frame 310. As a result, the forward portion having the opening 406a is moved upwardly to raise the reel base support 510, the reel base 520 on the support 510 and the reel drive member 515 through the locking member 514. More specifically, the reel drive member 515 located at the cassette receiving inlet is adapted to be in a retired position so as not to hinder the cassette 500 at the time of cassette loading and to be raised for engagement with a reel of the cassette 500 when the cassette is set in the position. This mechanism can reduce the thickness of the entire structure.

When the tape feeding is stopped by a tape end detection signal, or by an operation for fast feeding or rewinding, etc. in relation with the reel base 530, the electromagnetic mechanism 357 is deenergized by a detection signal from the reed switch as mentioned above. The attraction by the electromagnetic mechanism 357 is thus lost and the engagement of the engaging member 345 with the lock portion 372 of the interlocking link 307 is released. The slide member 304 returns to its original position at the entrance of the cassette loading by a force stored by the spring 602. At an early stage of the retreating, the cam portion 344 acts on the pin 311a so as to retire the head plate 313 from an advanced position where the head and pinch roller are engaged with the cassette 500 through the interlocking member 312. In this state, a switch connected in an electric circuit for the motor 320 is opened to stop the rotation of the motor. Thus, an automatic stop operation is carried out. In the course of the retreat of the head plate 313, the projection 420 of the interlocking member 312 returns to its original position. On the other hand, the resilient member 425 is released from depression by the operating portion 418 upon rising of the cassette receiving frame 310. The projection 420 is brought into engagement with the locking projection 424 of the resilient member 425 reset from its depressed position. Thus, the head plate 313 is positively held at a retired position.

When an operation of manually depressing the eject-operation lever 328 in the mode of playback or stop, the switch 588 is opened by the operating cam portion 587 to deenergize the electromagnetic mechanism 357. As a result, the head plate 313 is caused to retreat and then the roller 367 and the projection 417 are raised from the positions shown by solid lines in FIG. 13, i.e., the lower end of the vertical portion 361a of the first slot 361, to the positions shown by the phantom lines in FIG. 13, i.e., the upper end of the vertical portion 361a. In the course of the rising of the projection 417, the head plate 313 is first retired and then the rear portion of the cassette receiving frame 310 is raised from the deck 400 so that the cassette 500 is pushed forwardly to be ejected in a manner similar to that of the aforesaid automatic ejection.

Figure 14:
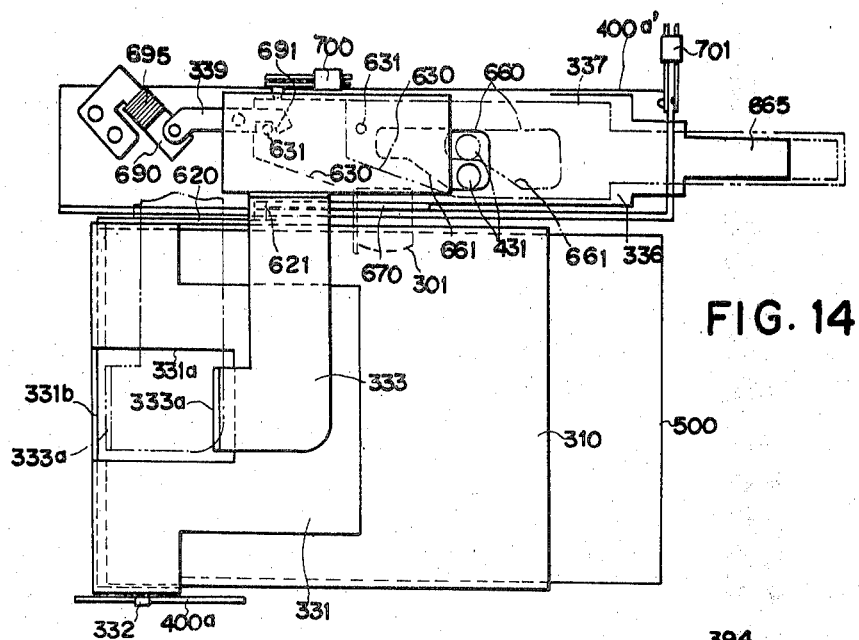
FIG. 14 is an explanatory plan view of another form of automatic shut-off mechanism employable in the present invention.

Although the operation mechanism is mounted on the sideward portion of the deck 400 in the tape player as illustrated in FIGS. 10 to 13, the operation mechanism may be provided above the head plate 313 and the automatic stop mechanism may be applied to a slot-in type tape player as illustrated in FIGS. 14 to 16. A bent portion 33a of a slide member 333, which is pushed by a cassette when the cassette is loaded, extends downwardly into a rear opening 331a of a pivotal frame 331 engaged with a cassette receiving frame 310 through a suitable resilient member so as to be bendable in relation with the frame 310. The frame 331 is pivotally connected to a deck 400a by a pivot 331. When the cassette 500 is pushed into the tape player as shown by a solid line in FIG. 15 and the slide member 333 reaches a position shown by a phantom lines in the figure, a pin 621 on a sidewall 620 of the pivotal frame 331 reaches a forward vertical portion of an L-shaped engaging slot 635 formed on a side 634 of the slide member 333 as illustrated in FIG. 16. Then, the frame 331 is released from its horizontal position shown in FIG. 15. More specifically, the pin 621 is lowered into a lowermost position of the vertical portion of the L-shaped slot 635 to lower the cassette receiving frame 310 onto the deck 400a as shown by the phentom line in FIG. 15 for establishing a playback mode. The slide member 333 has an operating portion 630 which is formed integrally therewith on an auxiliary deck 400a' formed at a side of the deck 400a and slidable with the slide member 333. An off-plate 336 having a play-operating portion 665 is slidably provided in relation with the operating portion 630. A lock member 339 is disposed so as to be engageable, at a free end thereof, with a lock pin 631 provided on the operating portion 630. A magnetic member 690 fixed to a base end of the lock member 339 is disposed in relation with an attracting plunger 695 mounted on the auxiliary deck 400a'. A power switch 700 for energizing the attraction plunger 695 etc. is provided in the vicinity of the final position of the retreat of the off-plate 336 and another switch 701 for automatic shut-off operation is connected in series with the switch 700 and provided at a forward end of the auxiliary deck 400a' so as to be on-off operated by shoulders of the eject-operation lever 337 and the off-plate 336. An engaging shaft 431 of a head plate having a head 301 is inserted in a cam slot 660 formed on the off-plate 336. More specifically, the shaft 431 is disposed so as to be engageable with a cam portion 621 of the cam slot 660. An operating portion 670 of the eject-operation lever 337 is disposed so as to be engageable with the pin 621 provided on the sidewall 620 of the frame 331 as illustrated in FIG. 16. Therefore, the pin 621 in its lowered position is raised by a cam edge 671 of the operating portion 670.

In the tape player as illustrated in FIGS. 14 to 16, engagement and disengagement of the slide member 333 and the off-plate 336 by the lock plate may be effected without using the electromagnetic mechanism. With this respect, a lock member is pivotally supported, at an end thereof, on the auxiliary deck 400a' and has, on opposite sides thereof, lock portions which are engageable with a lock pin provided on the slide member 333 and a lock pin provided on the opp-plate 336, respectively and slanting portions engageable with the respective lock pins for tilting the lock member. When one of the lock pins acts on the associated slanting portion to tilt the lock member, another lock pin is brought into engagement with the associated lock portion. On the contrary, when said another lock pin acts on the associated slanting portion, to tilt the lock member, said one lock pin is brought into engagement with the associated lock portion. Thus, the aforesaid engagement and disengagement may be carried out without the electromagnetic mechanism.

The operation of the tape player as illustrated in FIGS. 14 to 16 will be further described in detail. As described above, at the final stage of retreat of the slide member 333 by the cassette 500, a lock pin 631 abuts against a rearward slanting portion of a lock member 339 to enter a lock portion 691 and an operating portion 630 closes the power switch 700. In the course of the retreat of the slide member 333, the eject-operation lever 373 locked in the retired position upon the preceding ejecting operation is released to restore its original forward position. Upon this resetting of the eject-operation lever, the switch 701 is closed to energize the electromagnetic mechanism 695 to lock the lock member 339. In this state where the slide member 333 is fully depressed backwardly, the pin 621 is positioned in the vertical portion of the L-shaped slot 635 so that the frame 331 rotates around the pivot 332 from the position of the solid line in FIG. 15 to the position of the phantom line in FIG. 15 to put (slot-in) the cassette receiving frame 330 onto the deck 440a. Upon closing of the power switches 700 and 701, the motor is driven. Under this condition, when the play operating portion 665 formed on the off-plate 336 is depressed, the off-plate 336 is caused to retreat so that the cam slot 660 is moved from the position of the phantom line in FIG. 14 to the position of the solid line in FIG. 14. Then, the head plate is caused to advance through the shaft 431 to bring the head 301 to the reproducing end face of the cassette 500. Thus, a playback mode is established. Upon receipt of a tape end signal, the electromagnetic mechanism 695 is deenergized to release holding of the off-plate 336. Then, the off-plate 336 returns to the forward position, while actuating the shaft 431 by the cam portion 661 to cause the head plate to retreat. At a final stage of the resetting of the off-plate 336, the switch 701 is opened to stop the serial operation until the off-plate 336 is in its retired position. Thus, automatic shut-off mode is established where only the pressing of the head and the pinch roller is released. Depression of the eject-operation lever 337 will raise the frame 330 with the cassette therein through pivotal movement of the pivotal frame 331 as described above and as can be seen from FIG. 16. When the pin 621 reaches the uppermost end of the L-shaped slot 635, the slide member 333 is pulled out and an ejection operation is attained. In this connection, it is to be noted that when the eject-operation lever 337 is depressed during a playback operation, the switch 701 is first opened to deenergize the electromagnetic mechanism 695 and then the pivotal frame 331 is rotated as illustrated in FIG. 16. Deenergization of the electromagnetic mechanism 695 causes the off-plate 336 to be displaced in substantially the same manner as an automatic shut-off operation. Thus, it can be understood that a stop mode is established by a short stroke of depression of the eject-operation lever as described above.

Figure 17:
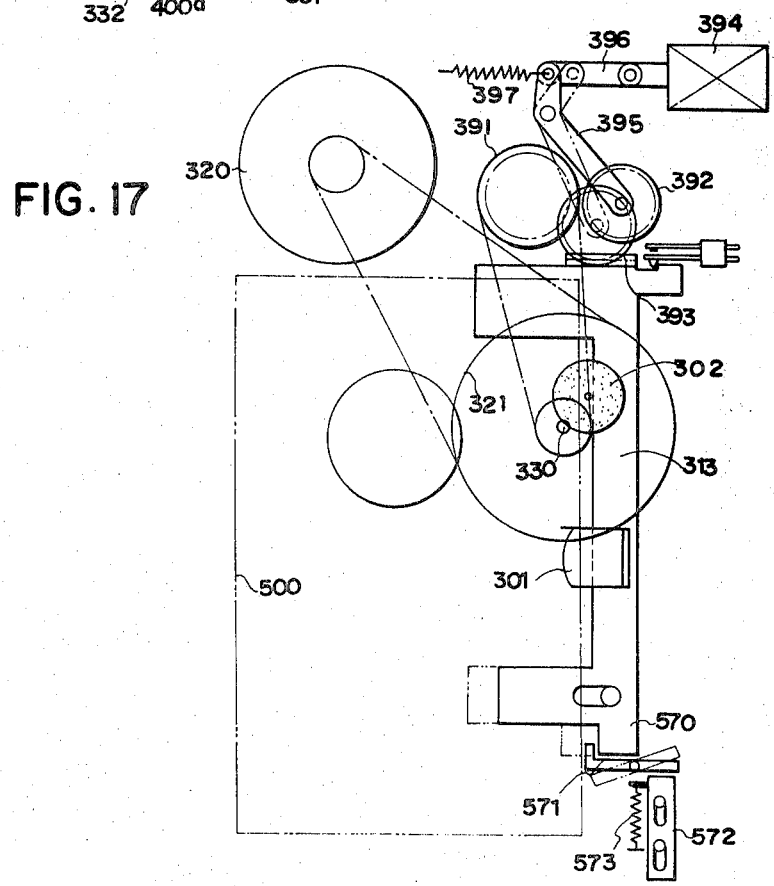
FIG. 17 is an explanatory plan view of a further form of automatic shut-off mechanism employable in the present invention.

FIG. 17 illustrates another form of automatic shut-off mechanism with an idler gear employable in the present invention. As in the foregoing cases, a flywheel 321 having a capstan 330 is driven by a motor 320 and a pinch roller 302 on a head plate 313 having a head 301 thereon is pressed against the capstan 330 to drive a tape. However, in the mechanism illustrated in FIG. 17, the head plate 313 has a rack portion 393 formed at a side portion thereof. A deck has an interlocking gear 391 interlocked with the capstan 330 and an idler gear 392 which is actuated by an electromagnetic plunger 394 so as to engage with the interlocking gear 391, and the rack portion 393. The plunger 394 is connected to an actuating lever 395 through a connecting rod 396. The idler gear 392 is mounted on an end of the actuating lever 395 and a spring 397 is provided at another end of the actuating lever 395 so as to oppose to the pulling by the electromagnetic plunger 394. An engaging portion 570 is formed at another side portion of the head plate 313 which is engageable with an end of an interlocking member 571 pivotally supported at a central portion thereof. Another end of the interlocking member 571 is disposed so as to be engageable with a rear end of a play-operation lever 572. A resetting spring 573 is provided on the play-operation lever 572.

The operation of the automatic shut-off mechanism illustrated in FIG. 17 will now be described. The operation caused upon loading of the cassette is substantially the same as in the tape player illustrated in FIGS. 14 to 16. Stated illustratively, a cassette receiving frame 330 is lowered onto a playback position, while expelling an eject-operation lever. In this state, when the play-operation lever 272 is depressed to release the engaging portion 570 of the head plate 313, the head plate 313 is advanced towards the loaded cassette by a spring such as the spring 609 in the tape player illustrated in FIGS. 10 to 13 to establish a play-mode. In the play-mode, the rack portion 393 of the head plate 313 is also in its advanced position. Under these conditions, when a reel base rotation stop signal is supplied, the electromagnetic plunger 394 is energized to bring the idler gear 392 into mesh with the interlocking gear 391 and the rack portion 393 as illustrated by a phantom line in FIG. 17. Then, the head plate 313 is caused to retire by a driving force through the interlocking gear 391. When the head plate 313 retreats a bit, a switch of the electromagnetic plunger 394 is opened to deenergize the plunger 394 again. The idler gear 392 is disengaged by the action of the spring 397 to attain an automatic shut-off operation. In this state, if the eject-operation lever is depressed, an ejecting operation is carried out in the same manner as in the tape player of FIGS. 14 to 16.

In accordance with these embodiments, the automatic shut-off mechanism as described above can effect automatic shut-off by stopping motor driving while automatically causing the head plate to retire for preventing deformation of the pinch rollers etc., deterioration in the performance and shortening of the life. In addition, a small force will suffice to carry out the automatic shut-off operation and the structure of the mechanism can be simple.

We claim:

1. In a magnetic record/playback apparatus including a head plate on which a recording/playback head and first and second pinch rollers are supported, first and second capstans associated respectively with said first and second pinch rollers, manually operable play-operation means for displacing said head plate from an inoperative position to a play position where said head is adjacent the tape and the pinch rollers are adjacent to said capstans, first changeover means having first and second positions respectively before and subsequent to an end of tape condition of the apparatus for alternatively moving said first and second pinch rollers respectively against the tape to press the same against the associated one of the capstans, so as to effect respectively forward and reverse tape feeding directions, second changeover means movable with said first changeover means and having corresponding first and second positions respectively for rotating the takeup side of the tape pack to effect respectively forward and reverse tape feeding directions, tape pack receiving and positioning means for receiving and positioning a magnetic tape pack inserted into the apparatus in a play-position so that the tape is adjacent to said head and pinch rollers when said head plate is in said play-position, and manually operable ejecting means for ejecting said tape pack from said play-position, the improvement which comprises: first means moved upon operation of said manually operable ejecting means when effecting an ejecting operation, and second means associated with said changeover means which is engaged by said first means during an ejection operation when said changeover means are in said second position to effect a reverse tape feeding direction, moving said changeover means into said first position whereby reproducing is automatically resumed in a forward feeding direction after a tape pack ejection operation is carried out and upon resumption of a play-operation.

2. The apparatus according to claim 1 which further comprises releasable lock means for automatically holding said manually operable play-operating means in a position which places said head plate in said play-position, manually operable play-stop means for releasing said lock means so that the manually operable play-operating means and the head plate return to their initial inoperative positions, interlocking means which couples the movement of said play-operation means to said head plate so that the head plate is moved into said play-position in response to the operation of said play-operation means, and means responsive to the movement of said head plate to said play-position for enabling said second changeover means to be operative.

3. The apparatus according to claim 1 which further includes locking means for said play-operation means, said manually operable play-operating means being a manually depressible means which is locked by said lock means in a depressed state which places said head plate into said play-position, said manually operable ejecting means also being a play-stop means which when operated initially releases said lock means and said manually operable play-operating means from said depressed condition without effecting a tape pack ejecting operation, and when subsequently operated effects the ejection of said tape pack means from said play-position and a tape feeding changeover operation if the tape feed was just previously in said reverse direction.

* * * * *